(12) United States Patent
Wilhelm et al.

(10) Patent No.: US 9,524,239 B2
(45) Date of Patent: Dec. 20, 2016

(54) SELF SERVICE PROPAGATION OF CUSTOM EXTENSION FIELDS INTO WEB SERVICES

(71) Applicants: Georg Wilhelm, Nussloch (DE); Daniel Niehoff, Sandhausen (DE); Uwe Schlarb, Oestringen (DE); Matthias Lehr, Weinheim a.d.B. (DE); Rene Dehn, Sinsheim (DE); Daniel Figus, Wallduern (DE); Ralf Schroth, St. Leon-Rot (DE); Steffen Witt, Heidelberg (DE); Daniel Wachs, Frankenthal (DE); Knut Heusermann, Bad Schoenborn (DE)

(72) Inventors: Georg Wilhelm, Nussloch (DE); Daniel Niehoff, Sandhausen (DE); Uwe Schlarb, Oestringen (DE); Matthias Lehr, Weinheim a.d.B. (DE); Rene Dehn, Sinsheim (DE); Daniel Figus, Wallduern (DE); Ralf Schroth, St. Leon-Rot (DE); Steffen Witt, Heidelberg (DE); Daniel Wachs, Frankenthal (DE); Knut Heusermann, Bad Schoenborn (DE)

(73) Assignee: SAP SE, Walldorf (DE)

( * ) Notice: Subject to any disclaimer, the term of this patent is extended or adjusted under 35 U.S.C. 154(b) by 223 days.

(21) Appl. No.: 13/741,273

(22) Filed: Jan. 14, 2013

(65) Prior Publication Data
US 2014/0201654 A1    Jul. 17, 2014

(51) Int. Cl.
*G06F 9/44*     (2006.01)
*G06F 12/08*    (2016.01)
*G06F 21/55*    (2013.01)
*H04L 9/00*     (2006.01)

(52) U.S. Cl.
CPC ....... *G06F 12/0808* (2013.01); *G06F 12/0802* (2013.01); *G06F 21/556* (2013.01); *H04L 9/003* (2013.01); *G06F 2201/885* (2013.01); *G06F 2212/1052* (2013.01)

(58) Field of Classification Search
CPC .......................... G06F 3/04842; G06F 3/0484
USPC .................................. 707/E17.005, 999.103
See application file for complete search history.

(56) References Cited

U.S. PATENT DOCUMENTS

| | | |
|---|---|---|
| 5,819,283 A | 10/1998 | Turkowski |
| 7,080,353 B2 | 7/2006 | Rosenberg et al. |
| 7,318,066 B2 | 1/2008 | Kaufman et al. |
| 7,725,873 B2 | 5/2010 | Shepard et al. |
| 7,801,886 B1 | 9/2010 | Gabriel et al. |

(Continued)

*Primary Examiner* — Jeffrey A Gaffin
*Assistant Examiner* — Mandrita Brahmachari
(74) *Attorney, Agent, or Firm* — Mintz Levin Cohn Ferris Glovsky and Popeo, P.C.

(57) ABSTRACT

Software solutions in a business software framework can expose their data via web services, which can readily provide access to all non-customized fields of objects included as part of the default installation of the software solution. However, customer-added extensions, such as for example custom fields and the like, added to customize the software solution for a specific business or business use can be difficult to add to web services by a typical business user who lacks technical abilities. Described herein are approaches to enabling addition of custom fields to web services via an intuitive interface that does not require technical understanding of the software solution, the business software framework, web services, etc.

14 Claims, 6 Drawing Sheets

(56) References Cited

U.S. PATENT DOCUMENTS

| | | |
|---|---|---|
| 8,108,433 B2 | 1/2012 | Baeuerle et al. |
| 8,108,434 B2 | 1/2012 | Baeuerle et al. |
| 8,224,828 B2 | 7/2012 | Figus |
| 8,356,056 B2 | 1/2013 | Baeuerle et al. |
| 2002/0174417 A1* | 11/2002 | Sijacic ............... G06F 9/465 717/147 |
| 2003/0225937 A1* | 12/2003 | Reiss et al. ............... 709/332 |
| 2005/0021536 A1 | 1/2005 | Fiedler et al. |
| 2005/0172261 A1 | 8/2005 | Yuknewicz et al. |
| 2005/0229186 A1 | 10/2005 | Mitchell et al. |
| 2007/0074100 A1* | 3/2007 | Yan ................... G06Q 10/10 715/210 |
| 2007/0078950 A1* | 4/2007 | Hopkins ......... G06F 17/30861 709/217 |
| 2008/0005623 A1 | 1/2008 | Said |
| 2008/0059504 A1* | 3/2008 | Barbetta et al. ............ 707/102 |
| 2009/0037453 A1* | 2/2009 | Kemmler ......... G06F 17/3089 |
| 2009/0100341 A1* | 4/2009 | Cruz et al. ................. 715/733 |
| 2009/0204635 A1* | 8/2009 | McCormack ..... G06F 17/30289 |
| 2010/0162147 A1 | 6/2010 | Ritter et al. |
| 2011/0119618 A1* | 5/2011 | Nestler et al. .............. 715/781 |
| 2012/0023130 A1 | 1/2012 | Schlarb et al. |
| 2012/0166928 A1* | 6/2012 | Stern et al. ................ 715/223 |
| 2014/0039943 A1* | 2/2014 | Ghindici ............. G06Q 10/02 705/5 |

* cited by examiner

```
<xsd:schema targetNamespace="http://sap.com/xi/AP/Extensibility/GeneratedObjects"
      xmlns:ccts="urn:un:unece:uncefact:documentation:standard:CoreComponentsTechnicalSpecification:3.0"
      ...>
  <xsd:simpleType name="Ext00000000000011ED19790E780D1114FD6">
    <xsd:annotation>
      <xsd:documentation xml:lang="EN">
        <ccts:RepresentationTerm>Name</ccts:RepresentationTerm>
      </xsd:documentation>
    </xsd:annotation>
    <xsd:restriction base="xsd:string"/>
  </xsd:simpleType>
</xsd:schema>
```

```
<xsd:schema targetNamespace="http://sap.com/xi/AP/CustomerExtension/BYD/ZZZZZ"
      xmlns:ccts="urn:un:unece:uncefact:documentation:standard:CoreComponentsTechnicalSpecification:3.0"
      ...>
  <xsd:group name="Ext00000000000011ED19790EFA9FDD58FD8">
    <xsd:sequence>
      <xsd:element name="EXTAddress00000000000011ED19790E780D10DCFD6" minOccurs="0" form="qualified"
          type="xi9:Ext00000000000011ED19790E780D1114FD6"/>
    </xsd:sequence>
  </xsd:group>
  <xsd:attributeGroup name="Ext00000000000011ED19790EFA9FDD58FD8"/>
</xsd:schema>
```

```
<xsd:complexType name="PointOfSaleTransactionBundleNotificationCashTransaction">
  <xsd:sequence>
    <xsd:element name="BatchID" type="xi5:PointOfSaleTransactionBatchID" minOccurs="0"/>
    <xsd:element name="CashTransactionCashItem" type="PointOfSaleTransactionBundleNotificationCashTransactionCashItem"
        maxOccurs="unbounded"/>
    <xsd:group ref="xi1:Ext00000000000011ED19790EFA9FDD58FD8"/>
    <xsd:group ref="xi1:Ext00000000000011EE19BED00BB906EC645"/>
  </xsd:sequence>
</xsd:complexType>
```

SELF SERVICE PROPAGATION OF CUSTOM EXTENSION FIELDS INTO WEB SERVICES

TECHNICAL FIELD

The subject matter described herein relates to propagation of custom extension fields into web services

BACKGROUND

Business software architectures (also referred to as business software frameworks), which can include enterprise resource planning systems, enterprise content management (ECM) systems, business process management (BPM) systems, product lifecycle management systems, and the like, can typically include one or more core software modules that provide a set of functionality defined by the vendor of the business software framework. In addition, the business software framework can include one or more interfaces or other capabilities to add functionality provided by a third party vendor (referred to herein as an external service provider), and can also include capabilities that allow customer organizations (e.g. an organization that purchases, licenses, or otherwise makes use of the business software framework in its business operations) to customize features of either or both of the core software modules and external service provider.

In some examples of business software frameworks, business data are presented using data structures, which can be referred to as data objects or business objects. Such data structures (referred to herein as business objects) can include a software model representing real-world elements of business transactions. For example, a business object can represent a business document such as a sales order, a purchase order, or an invoice. A business object can provide a framework for representing all or part of a business process, a business entity, or the like (e.g. a product, a business partner, a piece of equipment, a sales order, an employee, a customer or client of the customer organization, or the like). An instance of a business object can represent a concrete instance of the part of a business process, a business entity, or the like corresponding to the type of business object (e.g. a particular product, a particular business partner, a particular piece of equipment, a particular sales order, a particular employee, a particular customer of the customer organization, or the like). Such an instance includes both the software model and the data (e.g. master data, transactional data, or the like) related to the business object type and to the concrete instance of the entity represented by that business object type.

A business object can specify business logic, for example in the form of metadata or a meta-model, and can have any suitable structure appropriate for its functions. A business software framework vendor (e.g. a developer, software provider, or the like) can include one or many business objects relevant to a particular business scenario. The structure of the business objects can be based on the requirements of the business scenario. A customer deploying such a software solution might use pre-defined user interface features and other functionality supported by business objects provided as part of a core software platform or by an external service provider. However, a customer might also wish to customize one or more user interface features or other functionality to more closely model and support specific aspects of the customer's business operations. In a non-limiting example, a customer may wish to change a user interface associated with a sales order business object by adding a "Sub-Product Identifier" field next to an existing "Product Identifier" field.

SUMMARY

In one aspect, a method includes receiving a user input entered via a user interface of a business software framework, presenting, via a further user screen of the user interface, a list of available web services for making data of the business software framework available for migration to or integration with another software solution, dynamically generating executable code necessary to add the custom field to the selected web service at runtime upon detection of a user selection of a selected web service from the list of available web services, and providing access to the custom field via a call to the selected web service call using the executable code. The user input includes selection of an option to define a further usage of a custom field defined for a customer organization of the business software framework (e.g. an organization that uses a business software framework). The custom field extends a standard data structure of the business software framework.

In some variations one or more of the following can optionally be included in any feasible combination. The custom field can include at least one of a customized user interface, a customized print form, and a customized service interface added to the standard data structure. The user interface can be a runtime user interface. The option to define the further usage can be presented in an adaptation panel of the user interface that is displayed concurrently with a main panel of the user interface. The main panel can include data entry user interface features relating to the standard data structure extended by the custom field. The executable code can include encoded information about a type of the custom field, a definition of the custom field, and usage of the custom field. The executable code can include the web services definition language (WSDL).

Implementations of the current subject matter can include, but are not limited to, systems and methods including one or more features described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution, framework, architecture, etc., it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3A, FIG. 3B, and FIG. 3C show three example code segments in the web service definition language (WSDL) that can be used to represent custom fields consistent with implementations of the current subject matter;

When practical, similar reference numbers denote similar structures, features, or elements.

DETAILED DESCRIPTION

A customer organization using a business software framework can desire the ability to integrate its software solutions with other software solutions. For example, integration of a CRM solution (e.g. a CRM solution offered as a locally-installed and hosted server system at a customer organization's location, via a software as a service or SaaS arrangement, etc.) with a legacy ERP solution previously or already in use by the customer organization can be advantageous. Many types of integration between software solutions, including but not limited to those mentioned above, can typically be handled by two differing software solutions exposing data for import or use by another software solution. This exposing of data typically occurs via web services, which can readily provide access to standard fields of all objects (e.g. accounts, products, etc.) based on a mapping between standard fields of the differing software solutions.

As used herein, the term "web service" refers generally to a mode of communication between two electronic devices over a network connection (e.g. the Internet, the World Wide Web, an intranet, or the like). A web service can be generally characterized as a software function that is provided at a network address over a network connection and designed to support interoperable machine-to-machine interaction over a network. Web services typically include interfaces described in a machine-processable format (most commonly, the Web Services Description Language or WSDL). Other applications, computing systems, and the like can interact with a web service in a manner prescribed by a description of the web service, typically using simple object access protocol (SOAP) messages or the like, which can be conveyed using HTTP with an XML serialization in conjunction with other web-related standards.

WSDL is an XML format for describing network services as a set of endpoints operating on messages containing either document-oriented or procedure-oriented information. The operations and messages are generally described abstractly and bound to a concrete network protocol and message format to define an endpoint. Related concrete endpoints are combined into abstract endpoints (services). WSDL is extensible to allow description of endpoints and their messages regardless of what message formats or network protocols are used to communicate, including but not limited to SOAP, hypertext transfer protocol (HTTP) GET and POST request methods, multipurpose internet mail extensions (MIME), and the like.

Another example in which web services can be used to integrate data between different business software applications or other software solutions is a case in which a customer organization chooses to transition from or otherwise migrate its data and/or control over one or more processes or the like from a software solution offered by one vendor to another. Integration of existing custom fields established by the customer organization in the solution offered by the first vendor into the solution offered by the second vendor can also be desirable. In the case of a migration between a first software solution and second software solution, it can be necessary to extract data from the first software solution and move it into the second software solution.

The term "standard field" is used herein to refer to a field, or optionally to a feature, user interface element, or other data structure or functionality of a software solution (e.g. a software framework, an application, etc.). A standard field is one that is included within a non-customized implementation of the software solution. One or more standard fields can be present in a standard business object or other standard data structure of a core software platform, of a software solution supplied by a third party service provider, or the like. Software solutions generally also offer to a customer organization the capability to add one or more custom extension fields or other extensions to one or more of the standard business objects or other standard data structures provided by the solution.

A customer-added custom extension field or other extension (hereinafter referred to as a "custom field") to a data structure such as a business object can be available for consumption by other elements within a business software framework. Such elements can include, but are not limited to, other user interfaces, print forms, service interfaces, and the like. Co-owned and co-pending U.S. patent application no. 2012/0023130A1 describes approaches for adding custom fields to business objects to allow corresponding business object data to be consumed by other business entities. However, making these custom fields available for integration with or migration to another software solution (including but not limited to another business entity that consumes business object data) over a web service can present difficulties. Conventional approaches to this issue usually involve technical support (e.g. from the vendor of the software solution) to create a custom interface (e.g. a hard-coded set of WSDL instructions or the like) to allow a web service to access data in the custom fields.

In contrast, implementations of the current subject matter can support addition of custom fields to web services via a user interface approach that does not require a deep technical understanding of the underlying programming, APIs, or the like. A non-technical user at a customer organization can add custom fields to the web services in a straightforward, intuitive manner, for example using a UI tool for populating a custom field to a web service.

Figure 1:
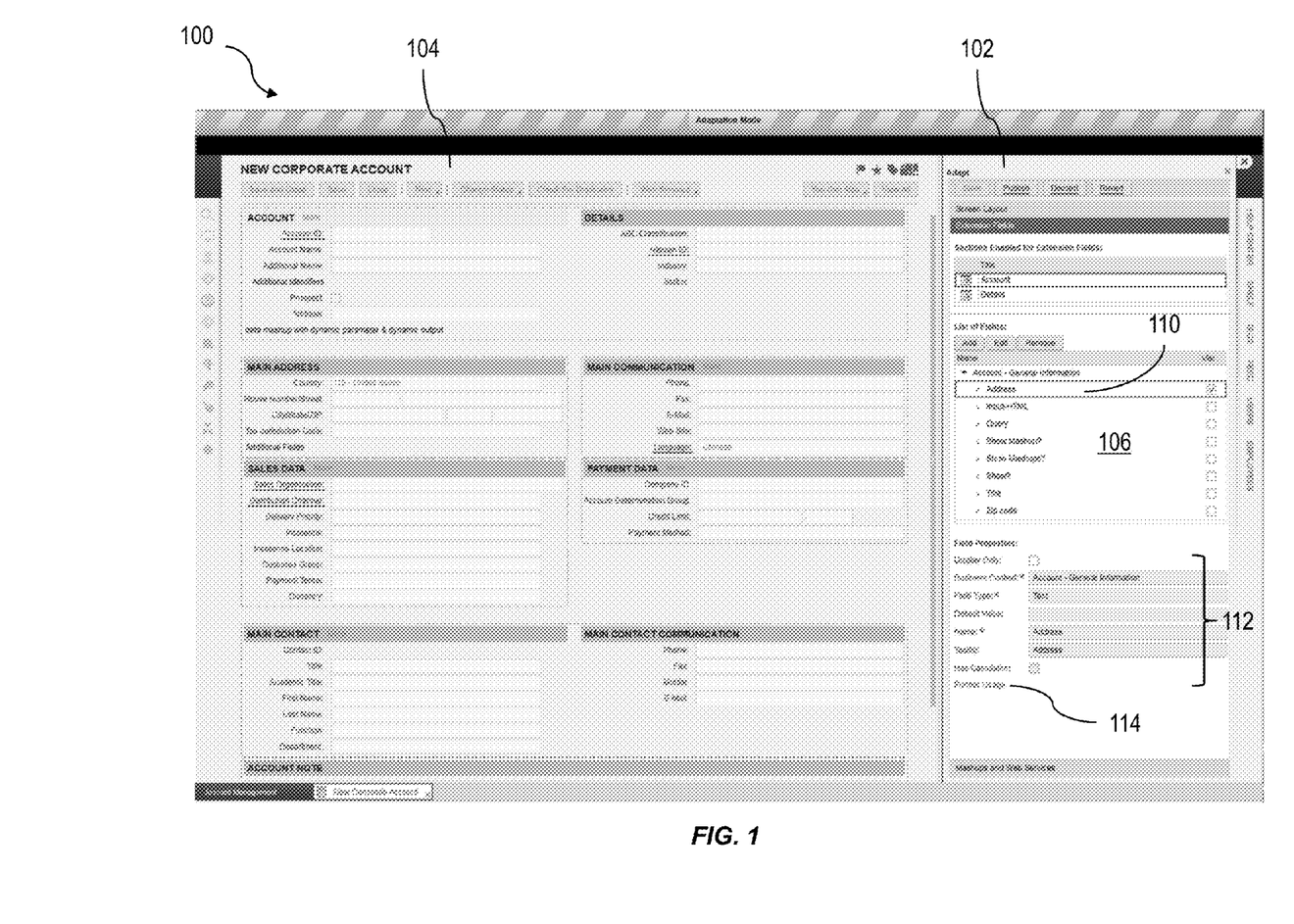
FIG. 1 is a screenshot showing features consistent with implementations of the current subject matter.

FIG. 1 shows a screenshot of an example user interface 100 of a software solution (e.g. a business software framework or the like). The example user interface 100 of FIG. 1 includes an example of tool features consistent with implementations of the current subject matter. Starting from a runtime user interface that can allow a user to maintain aspects of a business object or other data structure, the user can trigger a switch into an adaption mode. The adaption mode can include adaptation user interface features that can be displayed concurrently with data entry user interface features provided by the software solution for entering, changing, updating, or deleting data of an instance of a business object or other data structure. In the example of FIG. 1, the adaptation user interface features are provided in an adaption panel 102 appearing on the right side of the screenshot 100. As used herein, a panel can refer to any of a panel, a pane, a sidecar, a window, a frame, a box, a floating box or panel or window, or the like that can be displayed on a user interface screen concurrently with another panel and that can include one or more user interface elements. The adaptation panel 102 can also optionally be provided on a separate user interface screen that replaces other user interface content. The data entry user interface features are presented in a main panel 104 appearing on the left side of the user interface 100 shown in FIG. 1. Other configurations of user interface features providing similar functionality to those described herein are also within the scope of the current subject matter.

The adaptation panel 102 can support a variety of functions in addition to those described herein. With regards to making a custom field available for access via a web service, the adaptation panel 102 can display a list of fields 106 from which a specific field 110 can be selected by user input. In the example of FIG. 1, the selected specific field 110 is an "address" field. In a field properties section 112 of the adaptation panel 102, a user can perform various operations on the selected specific field 110, for example defining a business context within which the selected specific field 110 applies; defining a field type, a name, a tooltip, etc. associated with the selected specific field 110; and the like. Consistent with implementations of the current subject matter, a further usage user interface feature 114 can be provided. Selection of the further usage user interface feature 114 can cause the user interface to navigate to an additional further usage screen 200, which can in some examples be similar to or include one or more features illustrated in FIG. 2.

Figure 2:
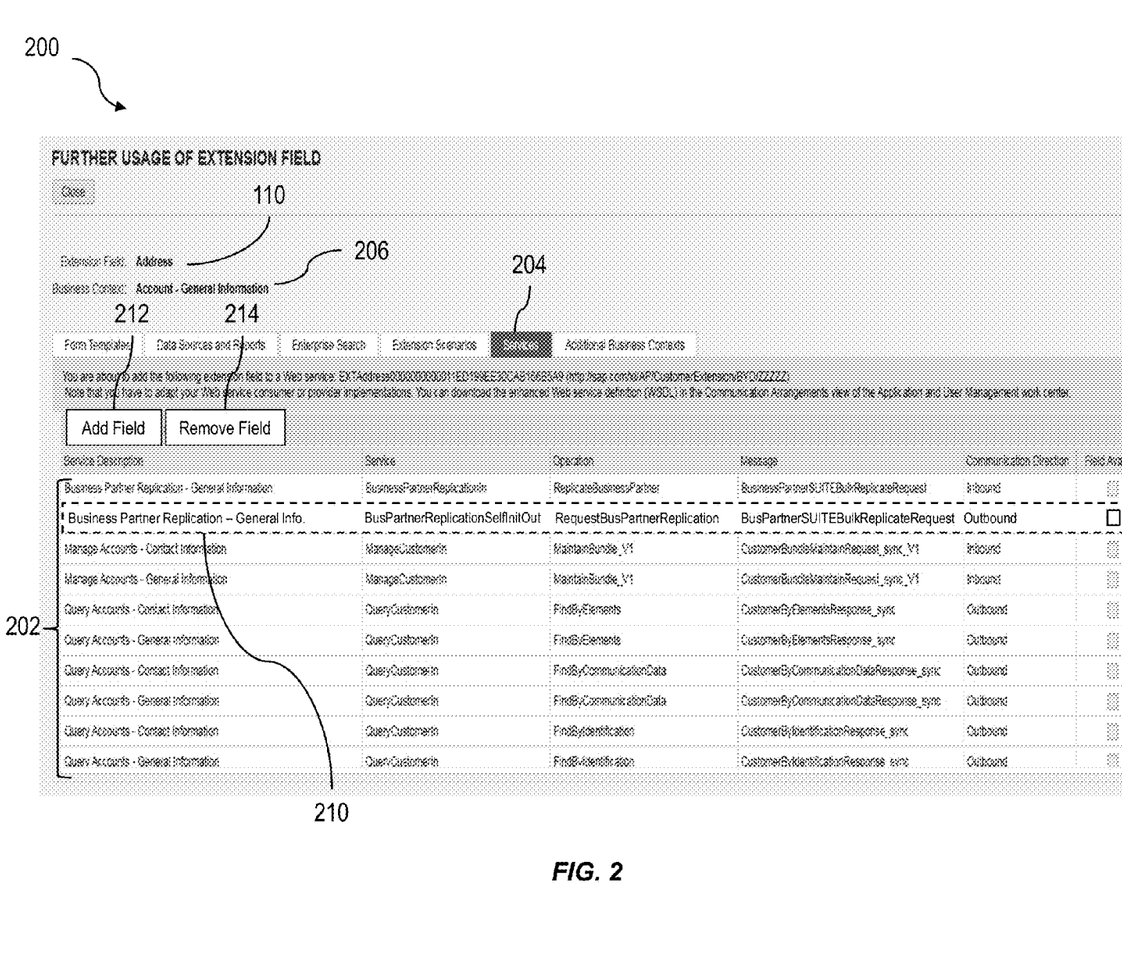
FIG. 2 is another screenshot showing features consistent with implementations of the current subject matter.

FIG. 2 shows a screenshot illustrating a further usage screen 200 that can be navigated to via user selection of a further usage user interface feature 114 in an adaptation panel 102. It should be noted that the further usage screen 200 can be a new screen that the user interface navigates to upon selecting the further usage user interface feature 114. Alternatively, the further usage screen 200 can be presented as a panel, a pane, a sidecar, a window, a frame, a box, a floating box or panel or window, or the like that can be displayed on a user interface screen concurrently with other user interface content. The further usage screen 200 can, among other optionally provided functionality, include the ability to display a listing of web services 202 through which content of the software solution can be provided. In the example of FIG. 2, this listing of available web services can be displayed via a services tab 204. Also as displayed in FIG. 2, the custom field 110 chosen in the adaptation panel 102 of FIG. 1 can be listed in the further usage screen 200. Additional information, such as for example an indication of the business context 206 of the custom field 110, can also optionally be displayed in the further usage screen 200.

A user can, using an user input of any feasible type, select a web service 210 from the listing of available web services, and can then add the chosen custom field 110 to this selected web service 210 by activating or otherwise selecting an "add" button 212 or some other user interface element or functionality for indicating that the chosen custom field 110 should be included in or otherwise made available by the selected web service 110. The further usage screen 200 can also include another user interface element or functionality for indicating that the chosen custom field 110 should not be included in or otherwise made available by the selected web service 110. In FIG. 2, for example, a "remove" button 214 can be activated or otherwise selected by a user to eliminate the chosen custom field 110 from the selected web service 110.

To assist a user in clearly identifying the available web services, each entry in the list of available web services 202 can provide information regarding one or more of service interface names, service operation names, name of a message type used by the web service, a communication direction (e.g. inbound or outbound), and the like. Consistent with some implementations of the current subject matter, the list of available web services 202 can be restricted to include only those web services for which extensibility is explicitly exposed for use by external applications or data consumers, for example via a flag or other designation indicating this. A core software platform developer can set such a flag or other designation as part of the software delivery of a business software framework or other software solution. Restriction of the list of available web services 202 can provide advantages in avoiding the creation of web services that could become incompatible in later releases of the business software framework or other software solution. An example of such a potentially incompatible service is a service that is only used internally within the business software framework or other software solution. Such an internal service could be deleted in a later release. Exclusion of such services from the list of available web services 202 is therefore advantageous to avoid confusion or dissatisfaction on the side of the customer organization if custom fields were added to a web service that no longer exists in a later release.

The approach outlined above with regard to FIG. 1 and FIG. 2 can be similar to the procedure that a business user (e.g. a user who is not necessarily technically included with regards to programming or coding) might follow if he or she were adding or editing a custom field or propagating it into a user interface, a print form, a report, or the like. In fact, the further usage screen 200 shown in FIG. 2 includes additional tabs besides the services tab 204. For example, one or more of a form templates tab, a data sources and reports tab, an enterprise search tab, an extension scenarios tab, an additional business contacts tab, and the like or other functionality can be included on the further usage screen 200 to allow addition, changes, deletion, etc. of the chosen custom field 110 in other consuming entities of the core software platform, external service provider software solutions, or the like.

FIG. 3A, FIG. 3B, and FIG. 3C respectively show three segments of code in WSDL. Such code segments can be automatically generated according to implementations of the current subject matter based on user inputs received via a user interface, for example as discussed above in reference to FIG. 1 and FIG. 2. The code segment 300 in FIG. 3A encodes information about a type of the custom field that is included for consumption via a web service. The code segment 302 in FIG. 3B encodes information about a definition of the custom field that is included for consumption via a web service. The code segment 304 in FIG. 3C encodes information about usage of the custom field that is included for consumption via a web service.

The custom field can be propagated into the web service/WSDL of selected web service in a manner that consumers of this web service that are not aware of the custom field are not adversely affected by inclusion of the custom field in that web service do not break. For example, adding a custom field to a migration or integration web service can be a fully compatible activity. For example, the code segment 302 of FIG. 3B illustrates that a "minOccurs" constraint can be set to a value of "0" within the code defining the custom field. Such a constraint, or other comparable statement or requirement within the automatically and dynamically generated code, can indicate that supplying the custom field within a web service call is not necessary, thereby ensure that adding of custom fields.

Figure 4:
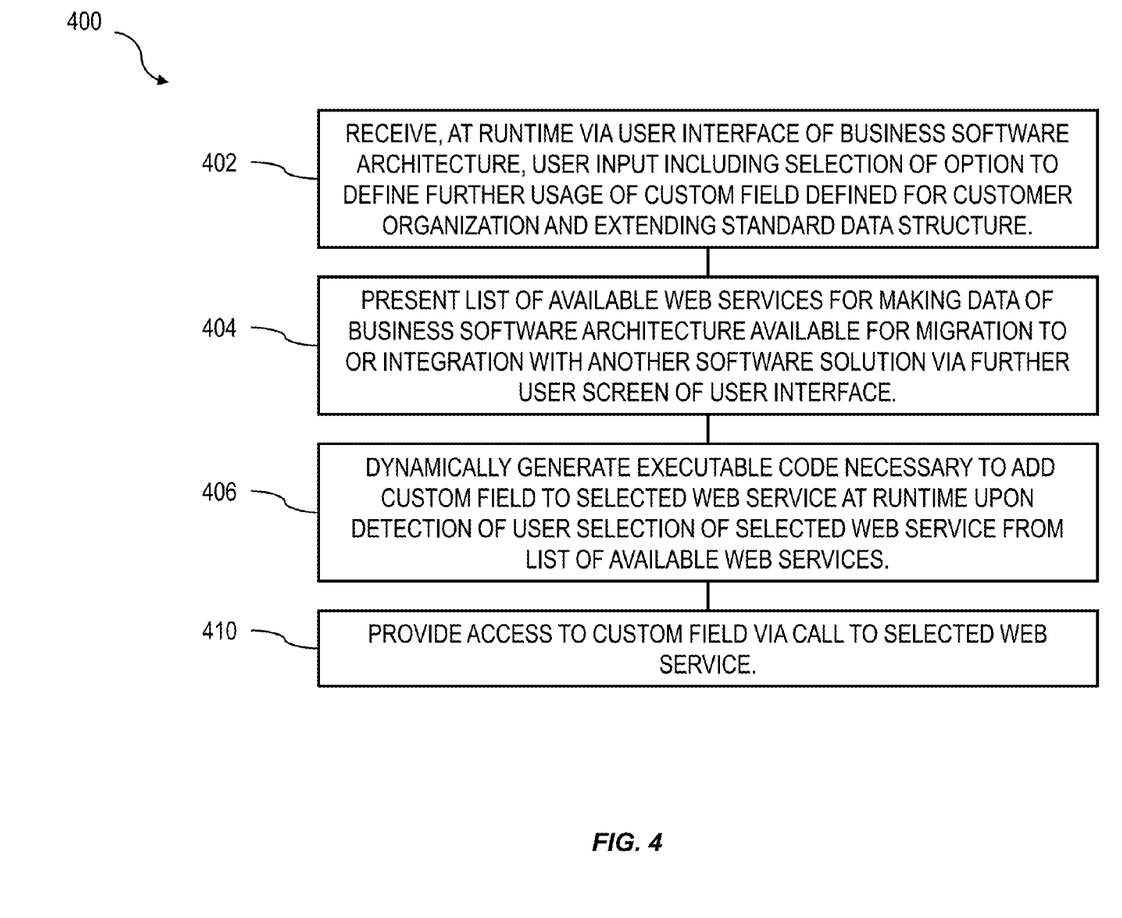
FIG. 4 is a process flow diagram illustrating aspects of a method having one or more features consistent with implementations of the current subject matter.

FIG. 4 shows a process flow chart 400 that illustrates features of a method. One or more of these features can be present in various implementations of the current subject matter. At 402, a user input entered via a user interface of a business software framework is received. The user input includes selection of an option to define a further usage of a custom field defined for a customer organization of the business software framework. At 404, a list of available web services for making data of the business software framework available for migration to or integration with another software solution is presented via a further user screen of the user interface. At runtime upon detection of a user selection of a selected web service from the list of available web services, executable code necessary to add the custom field to the selected web service is dynamically generated, and at 410, access to the custom field via a call to the selected web service call is provided using the executable code.

Figure 5:
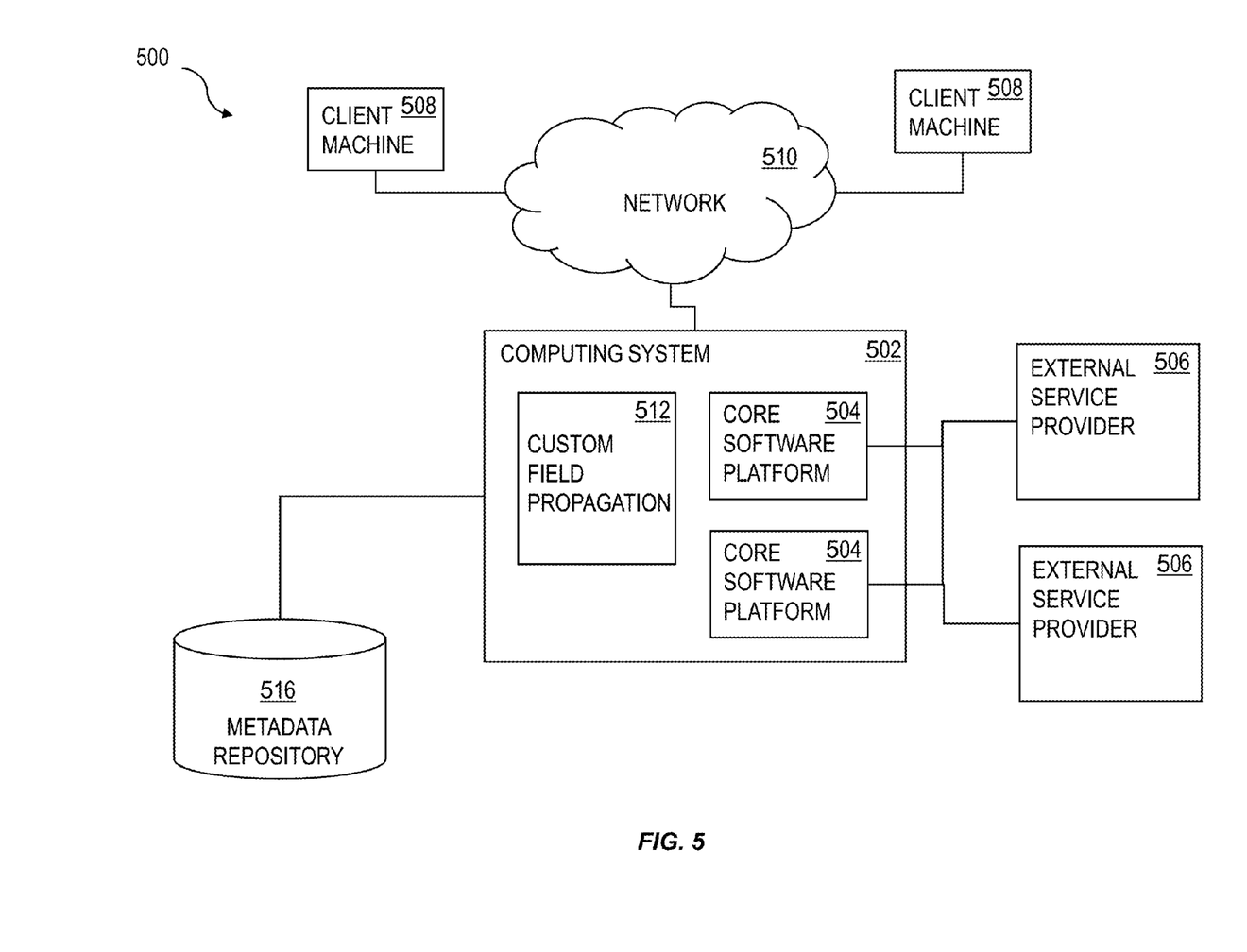
FIG. 5 is a diagram illustrating aspects of a system showing features consistent with implementations of the current subject matter.

The core software platform of an enterprise resource planning (ERP) system, other business software framework, or the like can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 5 shows a diagram of a system consistent with such an implementation. A computing system 502 can include one or more core software platform modules 504 providing one or more features of the business software system. The computing system can also aggregate or otherwise provide a gateway via which users can access functionality provided by one or more external service providers 506. Client machines 508 can access the computing system, either via a direct connection, a local terminal, or over a network 510 (e.g. a local area network, a wide area network, a wireless network, the Internet, or the like). A custom field propagation module, agent, etc. 512 can be hosted on the computing system 502 or alternatively, on an external system accessible over a network connection. The custom field propagation module, agent, etc. 512 can optionally include one or more discrete software and/or hardware modules that perform operations such as those described herein.

The custom field propagation module, agent, etc. 512 can access one or more metadata repositories and/or other data repositories 516 (e.g. process repositories, scenarios repositories, transactional data repositories, etc.) that can store definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some examples, the definition can optionally be stored as a business object. In some implementations, the business object can include a template definition of a standard business process. The template definition that can optionally be modified via one or more extensions that are stored in the one or more metadata repositories 516.

Smaller organizations can also benefit from use of business software functionality. However, such an organization may lack the necessary hardware resources, IT support, and/or consulting budget necessary to make use of a standalone business software software framework product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
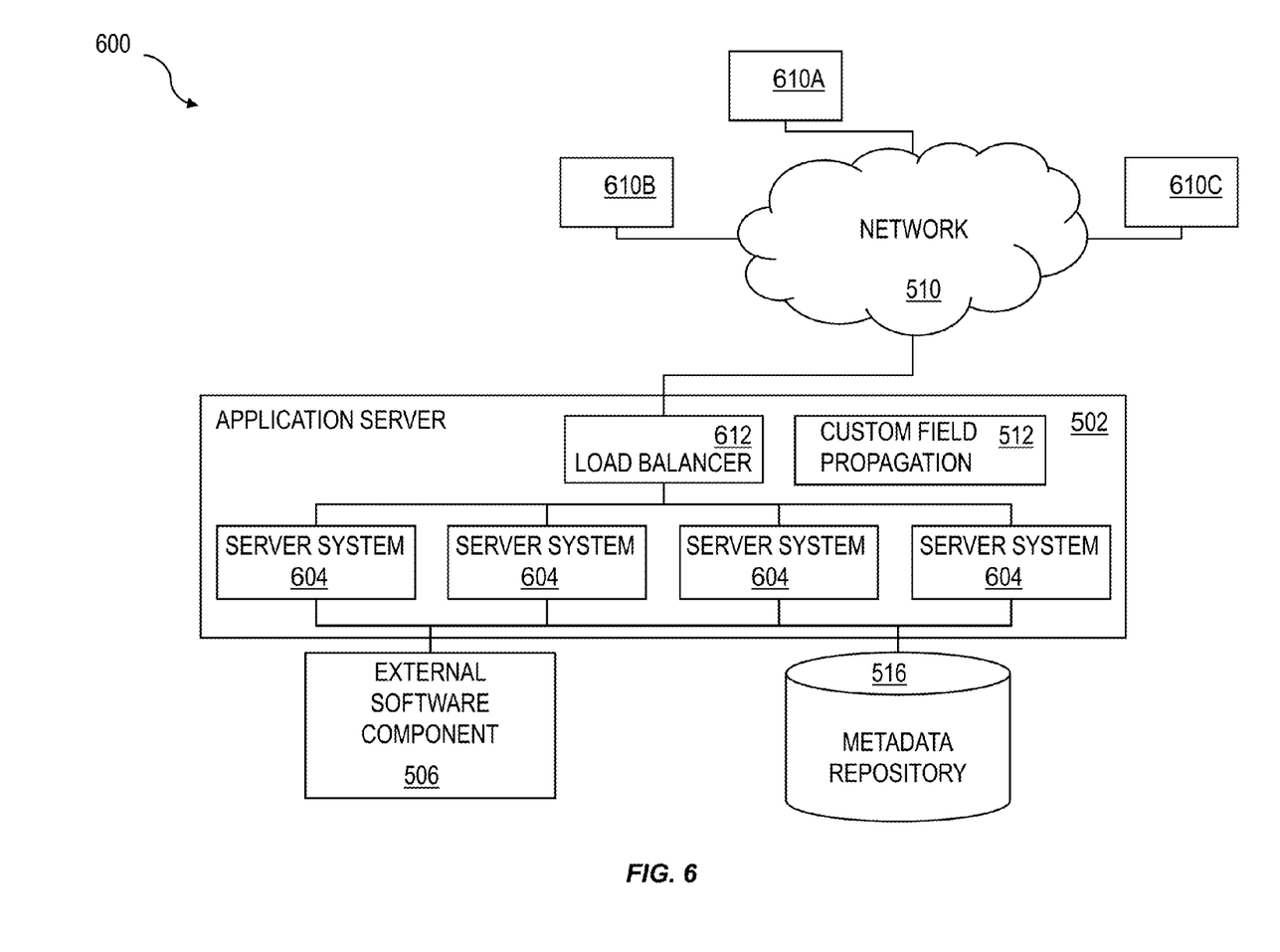
FIG. 6 is a diagram illustrating aspects of another system showing features consistent with implementations of the current subject matter.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. Instances of the core software platform 504 (not shown in FIG. 6) can be executed in a distributed manner across the server systems 604. A user can access the software delivery architecture across the network using a thin client, such as for example a web browser or the like, or other portal software running on a client machine. The application server 602 can access data and data objects stored in one or more data repositories 516. The application server 602 can also serve as a middleware component via which access is provided to one or more external software components 506 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 602 that includes multiple server systems 604 that handle processing loads distributed by a load balancer 612. Potential benefits from such an arrangement can include, but are not limited to, high and reliably continuous application server availability and minimization of unplanned downtime, phased updating of the multiple server systems 604 to permit continuous availability (one server system 604 can be taken offline while the other systems continue to provide services via the load balancer 612), scalability via addition or removal of a server system 604 that is accessed via the load balancer 612, and de-coupled lifecycle processes (such as for example system maintenance, software upgrades, etc.) that enable updating of the core software independently of tenant-specific customizations implemented by individual tenants.

As in the example illustrated in FIG. 5, the metadata repository 516 can store a business object that represents a template definition of a standard business process. Each individual tenant 610A-610C can customize that standard template according to the individual business process features specific to business of the organization to which that tenant is assigned. Customizations can be stored as extensions in the metadata repository.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer program product comprising a computer-readable storage medium storing one or more programs, the one or more programs comprising instructions that, when executed by at least one programmable processor, cause the at least one programmable processor to perform operations comprising:

receiving a user input entered via a user interface of a software framework, the user interface including a list of custom fields and field properties, the user input comprising selection of a custom field and an option element at the user interface, the selection of the option element triggering a further user interface to be presented where a definition of a further usage of the custom field is defined for the software framework, the custom field representing a custom extension of a standard data structure of the software framework to a selected web service that is selectable from a list of available web services presented at the further user interface, wherein the selected web service is configured to provide a mapping from the custom field to another format for use at another software framework;

presenting, via the further user interface, the list of available web services for making the custom field of the software framework available for migration to, or integration with, the another software framework;

generating, dynamically at runtime upon detection of a user selection of the selected web service from the list of available web services, executable code to add the custom field to the selected web service, the executable code including encoded information about a type of the custom field, a definition of the custom field, and usage of the custom field; and providing, using the executable code, access to the custom field via a call to the selected web service.

2. A computer program product as in claim 1, wherein the custom field comprises at least one of a customized user interface, a customized print form, and a customized service interface added to the standard data structure, wherein the definition of the further usage includes defining a name for the custom field and a type for the custom field.

3. A computer program product as in claim 1, wherein the user interface is a runtime user interface.

4. A computer program product as in claim 1, wherein the executable code comprises a web services definition language (WSDL).

5. A computer program product as in claim 1, wherein the option element is presented as an icon on an adaptation panel.

6. A system comprising:
at least one programmable processor; and
a machine-readable medium storing instructions that, when executed by the at least one processor, cause the at least one programmable processor to perform operations comprising:

receiving a user input entered via a user interface of a software framework, the user interface including a list of custom fields and field properties, the user input comprising selection of a custom field and an option element at the user interface, the selection of the option element triggering a further user interface to be presented where a definition of a further usage of the custom field is defined for the software framework, the custom field representing a custom extension of a standard data structure of the software framework to a selected web service that is selectable from a list of available web services presented at the further user interface, wherein the selected web service is configured to provide a mapping from the custom field to another format for use at another software framework;

presenting, via the further user interface, the list of available web services for making the custom field of the software framework available for migration to, or integration with, the another software framework;

generating, dynamically at runtime upon detection of a user selection of the selected web service from the list of available web services, executable code to add the custom field to the selected web service, the executable code including encoded information about a type of the custom field, a definition of the custom field, and usage of the custom field; and providing, using the executable code, access to the custom field via a call to the selected web service.

7. A system as in claim 6, wherein the custom field comprises at least one of a customized user interface, a customized print form, and a customized service interface added to the standard data structure, wherein the definition of the further usage includes defining a name for the custom field and a type for the custom field.

8. A system as in claim 6, wherein the user interface is a runtime user interface.

9. A system as in claim 6, wherein the executable code comprises a web services definition language (WSDL).

10. A computer-implemented method comprising:
receiving a user input entered via a user interface of a software framework, the user interface including a list of custom fields and field properties, the user input comprising selection of a custom field and an option element at the user interface, the selection of the option element triggering a further user interface to be presented where a definition of a further usage of the custom field is defined for the software framework, the custom field representing a custom extension of a standard data structure of the software framework to a selected web service that is selectable from a list of available web services presented at the further user interface, wherein the selected web service is configured to provide a mapping from the custom field to another format for use at another software framework;

presenting, via the further user interface, the list of available web services for making the custom field of the software framework available for migration to, or integration with, the another software framework;

generating, dynamically at runtime upon detection of a user selection of the selected web service from the list of available web services, executable code to add the custom field to the selected web service, the executable code including encoded information about a type of the custom field, a definition of the custom field, and usage of the custom field; and providing, using the executable code, access to the custom field via a call to the selected web service.

11. A computer-implemented method as in claim 10, wherein the custom field comprises at least one of a customized user interface, a customized print form, and a customized service interface added to the standard data structure, wherein the definition of the further usage includes defining a name for the custom field and a type for the custom field.

12. A computer-implemented method as in claim 10, wherein the user interface is a runtime user interface.

13. A computer-implemented method as in claim 10, wherein the executable code comprises a web services definition language (WSDL).

14. A computer-implemented method as in claim 10, wherein at least one of the receiving, the presenting, the generating, and the providing are performed by a system comprising at least one programmable processor.

* * * * *